(12) United States Patent
Zhang et al.

(10) Patent No.: US 11,485,651 B1
(45) Date of Patent: Nov. 1, 2022

(54) MOVABLY-CONNECTED AND CONTINUOUSLY-CONNECTED APPARATUS FOR UNINTERRUPTED HIGH-SALINITY WASTEWATER PURIFICATION

(71) Applicant: TONGJI UNIVERSITY, Shanghai (CN)

(72) Inventors: Yalei Zhang, Shanghai (CN); Xuefei Zhou, Shanghai (CN); Jiabin Chen, Shanghai (CN); Yinchuan Yang, Shanghai (CN); Lei Wang, Shanghai (CN); Xinmiao Zhang, Shanghai (CN); Wenbiao Wang, Shanghai (CN); Yegang Chen, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 17/511,286

(22) Filed: Oct. 26, 2021

(30) Foreign Application Priority Data

Jun. 28, 2021 (CN) .......................... 202110718082.3

(51) Int. Cl.
*C02F 1/28* (2006.01)
*C02F 1/00* (2006.01)
*B01D 15/02* (2006.01)

(52) U.S. Cl.
CPC .............. *C02F 1/285* (2013.01); *B01D 15/02* (2013.01); *C02F 1/001* (2013.01); *C02F 1/006* (2013.01); *C02F 2201/005* (2013.01); *C02F 2303/16* (2013.01)

(58) Field of Classification Search
None
See application file for complete search history.

(56) References Cited

U.S. PATENT DOCUMENTS

| | | |
|---|---|---|
| 8,158,002 B1 * | 4/2012 | Lupton ................ C08B 15/005 |
| | | 210/488 |
| 11,260,325 B2 * | 3/2022 | Dai ........................ C02F 1/004 |
| 2022/0119599 A1 * | 4/2022 | Zhang ...................... C08J 3/247 |

FOREIGN PATENT DOCUMENTS

| | | |
|---|---|---|
| CN | 110745903 A | 2/2020 |
| CN | 112340853 A | 2/2021 |
| CN | 212669269 U | 3/2021 |

(Continued)

*Primary Examiner* — Robert J Popovics
(74) *Attorney, Agent, or Firm* — Dragon Sun Law Firm, PC; Jinggao Li, Esq.; Nathaniel Perkins

(57) ABSTRACT

A movably-connected and continuously-connected apparatus for uninterrupted high-salinity wastewater purification includes a high-salinity wastewater adsorption treatment system and a movably-connected drainage system embedded in the treatment system. The high-salinity wastewater adsorption treatment system includes four purification zone partition plates, a hollow cylindrical purification zone, a cylindrical water distribution sump located in an axial center of the purification zone, a rotating shaft, a motor, a fixed support and a water tank; the four purification zone partition plates include a first partition plate forming an angle of 135° with a horizontal direction from left to right, a second partition plate forming an angle of 45° with the horizontal direction from left to right, a third partition plate forming an angle of 135° with a vertical direction from bottom to top and a fourth partition plate forming an angle of 135° with the vertical direction from bottom to top.

9 Claims, 6 Drawing Sheets

(56) References Cited

FOREIGN PATENT DOCUMENTS

| | | |
|---|---|---|
| CN | 112591841 A | 4/2021 |
| JP | 2011025213 A | 2/2011 |
| KR | 20160106251 A | 9/2016 |
| WO | 2016080241 A1 | 9/2017 |

* cited by examiner

MOVABLY-CONNECTED AND CONTINUOUSLY-CONNECTED APPARATUS FOR UNINTERRUPTED HIGH-SALINITY WASTEWATER PURIFICATION

CROSS-REFERENCE TO RELATED APPLICATION

This application is based upon and claims priority to Chinese Patent Application No. 202110718082.3, filed on Jun. 28, 2021, the entire contents of which are incorporated herein by reference.

TECHNICAL FIELD

The present disclosure belongs to the technical field of environmental engineering, and more particularly, relates to a movably-connected and continuously-connected apparatus for uninterrupted high-salinity wastewater purification.

BACKGROUND

As the chief component of industrial production wastewater, high-salinity wastewater has become a major environmental issue for industrial development and wastewater treatment due to its large discharge amount and complex treatment.

Any discharge of high-salinity wastewater not in compliance with the required standard will not only waste salt and water resources, but will also pollute the environment substantially. As an important environmental factor in the water environment, salinity directly or indirectly affects the growth and reproduction of aquatic organisms. Thus, a sharp increase in the salinity of the water environment will disturb the osmotic balance between the aquatic species and their living environment, which causes cell dehydration and decreased turgor pressure, leading to plasmolysis and metabolic disorder or even death. Additionally, the salt content in the soil nearby also increases and causes the degeneration of the soil structure, thereby affecting the soil ecosystem. Hence, the efficient treatment of high-salinity wastewater and the recycling of inorganic salts and water resources therefrom have important implications for resolving resource shortages and environmental pollution.

Due to its complex compositions and large concentrations, high-salinity wastewater can easily lead to an interruption of the treatment process and abnormal operation of the treatment equipment. In this regard, a pretreatment process must be involved prior to the formal process to reduce the concentration of some pollutants and treat them harmlessly. In the prior art, there are mainly a biological method, a chemical method and a physical method. The biological method is to treat the wastewater by using the metabolism and reproduction of microbes themselves. However, heavy metals and other substances in the high-salinity wastewater will destroy enzyme structures of the microbes, inhibit their growth and reproduction, or even lead to cell inactivation. The chemical method is to treat the wastewater by using chemical agents, but this method is costly and will also cause additional pollution. The physical method is to separate some pollutants from the wastewater system through physical means such as adsorption, flocculation and coagulation. This method is more practicable than the previous two methods but still has the following problems to be solved: (1) In the prior art, since desorption or backwashing is required after adsorption or filtration, only intermittent operation is allowed in this case, where a plurality of parallel processes are typically adopted for alternate operation, which is essentially the intermittent operation, and the initial investment and the operation cost are increased as a result. (2) The large mass of the adsorbent increases the total weight of the equipment, thereby increasing the operation cost such as the power consumption. (3) The adsorbing effect of the existing adsorbent is undesirable. As a novel light material, the hydrogel has an excellent adsorbing effect for the pollutants, but its use in the related field of high-salinity wastewater treatment remains absent.

It is, therefore, highly desirable to develop a treatment process that can treat high-salinity wastewater efficiently by using the hydrogel and can maintain continuous operation, which has important implications for existing environmental protection and eco-environmental protection.

SUMMARY

In view of the above defects, the present disclosure provides a movably-connected and continuously-connected apparatus for uninterrupted high-salinity wastewater purification, which can implement periodic and sequential operation of each purification unit, and can clean the filler conveniently by turning over and cleaning the filler, thereby greatly improving the service life of the system.

The present disclosure provides the following technical solutions: A movably-connected and continuously-connected apparatus for uninterrupted high-salinity wastewater purification includes a high-salinity wastewater adsorption treatment system and a movably-connected drainage system embedded in the high-salinity wastewater adsorption treatment system, where the high-salinity wastewater adsorption treatment system includes a hollow cylindrical purification zone, four purification zone partition plates for partitioning the purification zone, a cylindrical water distribution sump located in an axial center of the purification zone, a rotating shaft fixedly connected to the four purification zone partition plates, a motor for driving the rotating shaft to rotate, a fixed support fixedly connected to the motor and configured to support the apparatus, and a water tank provided under the purification zone; the four purification zone partition plates include a first partition plate, a second partition plate, a third partition plate and a fourth partition plate; and the first partition plate forms an angle of 135° with a horizontal direction from left to right, the second partition plate forms an angle of 45° with the horizontal direction from left to right, the third partition plate forms an angle of 135° with a vertical direction from bottom to top, and the fourth partition plate forms an angle of 135° with the vertical direction from bottom to top;

the four purification zone partition plates are uniformly distributed in the purification zone of the high-salinity wastewater adsorption treatment system, to axially and uniformly partition the purification zone into four independent sector-shaped treatment subzones: a first treatment subzone, a second treatment subzone, a third treatment subzone, and a fourth treatment subzone; and a hydrogel material having a purification effect is filled in each of the four treatment subzones;

the purification zone, the water distribution sump and the rotating shaft are coaxial;

the movably-connected drainage system includes a feed pipe, a feed water distribution pipe connected to the feed pipe, a cleaning water distribution pipe, a cleaning water feed pipe configured to feed water to the cleaning water distribution pipe and connected to the cleaning water distribution pipe, a water distribution partition plate, and a wastewater adsorption discharge pipe provided in the water distribution sump;

the feed water distribution pipe includes a first feed water distribution pipe, a second feed water distribution pipe, a third feed water distribution pipe and a fourth feed water distribution pipe that are respectively arranged at geometric centers of the four treatment subzones, the wastewater adsorption discharge pipe and the cleaning water distribution pipe are arranged in the cylindrical water distribution sump and have opposite feed directions in an axial direction, and the water distribution partition plate separates the wastewater adsorption discharge pipe from the cleaning water distribution pipe in a radial and vertical direction of the water distribution sump; and both the wastewater adsorption discharge pipe and the cleaning water distribution pipe are tangent to an inner wall of the water distribution sump; and a surface of the feed water distribution pipe is provided with feed water distribution holes circumferentially and uniformly distributed along cross sections of the feed water distribution pipe; a row of discharge water distribution holes facing vertically upward are sequentially and axially provided on the wastewater adsorption discharge pipe; and a row of cleaning water distribution holes facing vertically downward are sequentially and axially provided on the cleaning water distribution pipe.

Further, the water distribution sump may have a diameter of 100-350 mm; the water distribution sump may include a housing and at least one row of water distribution holes that are sequentially arranged on a surface of the housing, face vertically upward in an axial direction, and face the first treatment subzone; and circle centers of the feed water distribution holes and circle centers of the water distribution holes of the water distribution sump may be in a one-to-one correspondence in the first treatment subzone; and a filter screen may be provided on a contact surface between the sector-shaped treatment subzone and the water distribution sump, and a hole diameter of the filter screen may be 20-75% of a diameter of the water distribution hole of the water distribution sump.

Further, the feed water distribution hole may have a diameter of 2-6 mm; and the diameter of the feed water distribution hole may be 80-90% of a diameter of the corresponding water distribution hole of the water distribution sump.

Further, the feed pipe and the first feed water distribution pipe to the fourth feed water distribution pipe may be movably connected, a feed check valve may be provided on the feed water distribution pipe, and a diameter of the feed pipe may be 60-80% of the diameter of the water distribution sump.

Further, wastewater adsorption discharge baffles may be provided on the wastewater adsorption discharge pipe; and the wastewater adsorption discharge baffles may be distributed on a wall of the wastewater adsorption discharge pipe, such that water flowing out from the purification zone enters the wastewater adsorption discharge pipe rather than flowing into the water distribution sump.

Further, four rows of water distribution holes may be axially and sequentially arranged on the surface of the housing of the water distribution sump, and the four rows of water distribution holes may be circumferentially and uniformly distributed along cross sections of the water distribution sump.

Further, a cleaning water check valve for controlling whether the cleaning water feed pipe feeds water may be provided on the cleaning water feed pipe, and a diameter of the cleaning water feed pipe may be 20-30% of the diameter of the water distribution sump.

Further, cleaning water distribution baffles may be provided on the cleaning water distribution pipe; and the cleaning water distribution baffles may be distributed on a wall of the cleaning water distribution pipe, such that water flowing out from the cleaning water distribution pipe enters the purification zone rather than flowing into the water distribution sump.

Further, three cleaning water and wastewater discharge pipes in a row may be axially arranged outside each treatment subzone; each cleaning water and wastewater discharge pipe includes a timing solenoid valve; and the water tank may be configured to receive an effluent from the cleaning water and wastewater discharge pipe.

Further, a hydrogel filler in each treatment subzone may have a thickness of 300-800 mm, and the internal hydrogel material may have a filling rate of 60-90%; the purification zone partition plate and the water distribution sump may be welded and treated to be waterproof; the purification zone partition plate may be made of a stainless steel material; and the housing of the water distribution sump may be cylindrical, may have a diameter of 200-2,500 mm, and may be made of stainless steel.

The present disclosure has the following beneficial effects.

1. The apparatus provided by the present disclosure can discharge the high-salinity wastewater in the first treatment subzone by repeatedly rotating the high-salinity wastewater adsorption treatment system twice, and clean the first treatment subzone via the cleaning water feed pipe of the movably-connected drainage system. The feed direction of the cleaning water feed pipe is opposite to the feed direction of the feed water distribution pipe, and same as the discharge direction of the wastewater adsorption discharge pipe, such that the present disclosure can clean the high-salinity wastewater in each treatment subzone and clean the treatment subzone with the hydrogel in a snake-like direction to save the space of the whole apparatus; and the present disclosure can independently adsorb the wastewater in each treatment subzone and clean the treatment subzone with the hydrogel to save the time of the treatment method.

2. The present disclosure implements the independent operation of each treatment subzone innovatively with the special structure and has the strong controllability, thereby reducing the complexity in treatment and reducing the operation cost and the manpower.

3. The present disclosure implements the synchronous water feed and discharge innovatively with the movably-connected drainage system, thereby achieving the unintermittent operation of the system and the continuous treatment on the high-salinity wastewater; and the present disclosure has the high controllability and the desirable engineering application prospect.

4. The present disclosure provides the water distribution pipe at the geometric center of each independent subzone innovatively, and can implement the circumferential water distribution without the dead corner, thereby greatly improving the utilization rate of the system.

5. The present disclosure treats the high-salinity wastewater innovatively with the hydrogel, and fully exerts its advantages of the large adsorption amount, light weight and so on, thereby effectively accelerating the treatment effect on the high-salinity wastewater, and reducing the operation cost.

6. The present disclosure implements the periodic and sequential operation of each purification unit innovatively, and can clean the filler conveniently by turning over and cleaning the filler, which greatly improves the service life of the system.

7. The present disclosure has the desirable compatibility and adjustable length-to-width ratio, and can be mounted in parallel or series according to site conditions. With low limitations on the site, the present disclosure gains massive popularization and application.

8. With regard to market development, as the high-salinity wastewater is the major environmental issue for industrial development and wastewater treatment, its treatment has important social, environmental and ecological significances and the broad market prospect. The present disclosure is essential and desirable for the eco-environmental treatment as the novel technique in the high-salinity wastewater treatment.

9. With regard to engineering construction, the movably-connected and continuously-connected apparatus for uninterrupted high-salinity wastewater purification provided by the present disclosure has the strong adaptability, and can be applied to different types of high-salinity wastewater. Further, the apparatus can be applied to upgrade and reconstruction of existing industrial parks to avoid the environmental pollution caused by the illegal discharge of the high-salinity wastewater, and has the desirable engineering application value.

10. With regard to professional development, since the high-salinity wastewater treatment is the hotspot and difficulty in water treatment, the present disclosure solves the technical problems with novel materials and novel processes, and can effectively make up the blank of the professional skills in the related art, thereby greatly promoting the processional development.

BRIEF DESCRIPTION OF THE DRAWINGS

The present disclosure will be described below in more detail with reference to the examples and the accompanying drawings.

In the figures:
1-high-salinity wastewater adsorption treatment system, 11-purification zone partition plate, 11-1 first partition plate, 11-2 second partition plate, 11-3 third partition plate, 11-4 fourth partition plate, 12-purification zone, 121-first treatment subzone, 122-second treatment subzone, 123-third treatment subzone, 124-fourth treatment subzone, 13-water distribution sump, 131-housing of the water distribution sump, 132-water distribution hole of the water distribution sump, 14-rotating shaft, 15-fixed support, 16-water tank, 17-filter screen, and 18-motor; and 2-movably-connected drainage system, 20-feed pipe, 21-feed water distribution pipe, 201-first feed water distribution pipe 202-second feed water distribution pipe 203-third feed water distribution pipe 204-fourth feed water distribution pipe, 211-feed water distribution hole, 22-cleaning water distribution pipe, 220-cleaning water check valve, 221-cleaning water distribution hole, 222-cleaning water distribution baffle, 223-cleaning water feed pipe, 224-cleaning water and wastewater discharge pipe, 23-wastewater adsorption discharge pipe, 231-discharge water distribution hole, 232-wastewater adsorption discharge baffle, 24-water distribution partition plate, and 25-feed check valve.

DETAILED DESCRIPTION OF THE EMBODIMENTS

The technical solutions of the examples of the present disclosure are clearly and completely described below with reference to the accompanying drawings. Apparently, the described examples are merely a part rather than all of the examples of the present disclosure. All other examples obtained by a person of ordinary skill in the art based on the examples of the present disclosure without creative efforts shall fall within the protection scope of the present disclosure.

Example 1

Figure 1:
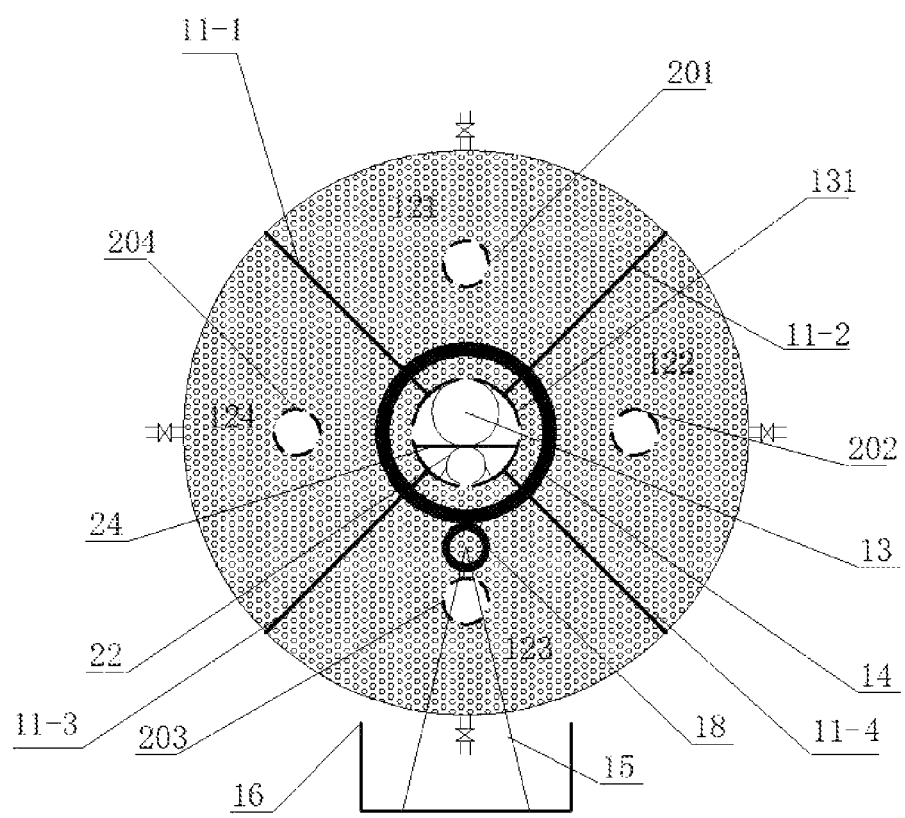
FIG. 1 is a cross-sectional side view of a movably-connected and continuously-connected apparatus for uninterrupted high-salinity wastewater purification provided by the present disclosure.
Figure 2:
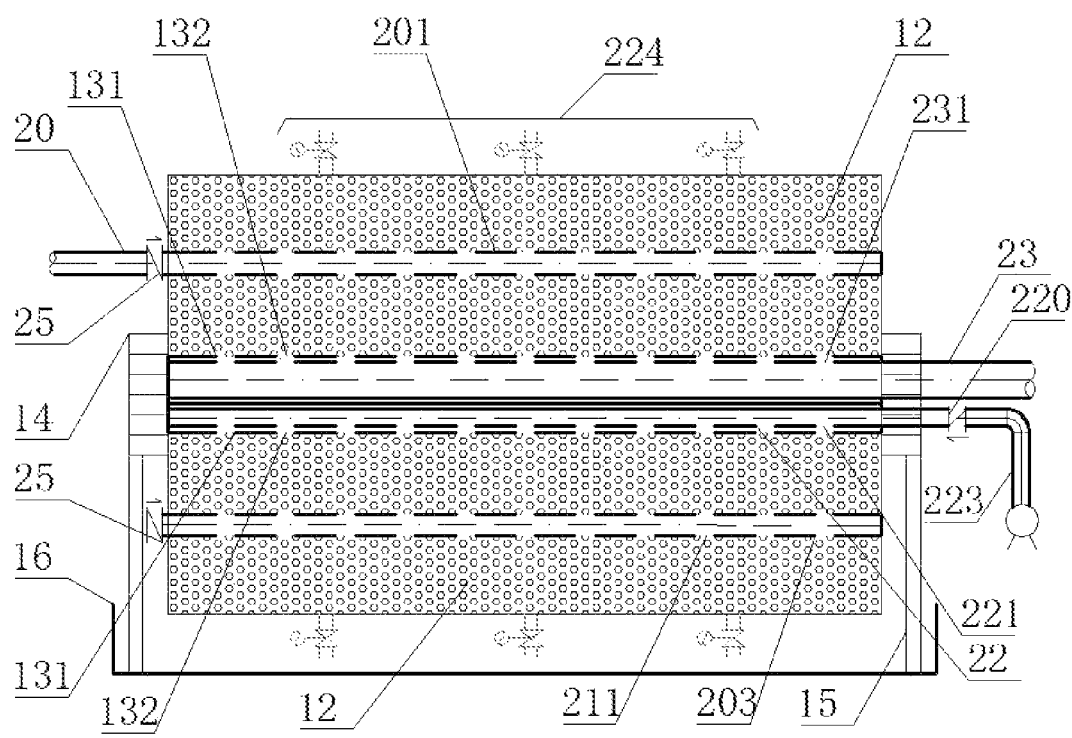
FIG. 2 is a front view of a movably-connected and continuously-connected apparatus for uninterrupted high-salinity wastewater purification provided by the present disclosure.

As shown in FIGS. 1-2, the example provides a movably-connected and continuously-connected apparatus for uninterrupted high-salinity wastewater purification. In the present disclosure, the high-salinity wastewater refers to the wastewater with a total salt content of 1-5% by mass percent. The apparatus includes a high-salinity wastewater adsorption treatment system 1 and a movably-connected drainage system 2 embedded in the high-salinity wastewater adsorption treatment system 1.

As shown in FIG. 1, the high-salinity wastewater adsorption treatment system 1 includes a hollow cylindrical purification zone 12, four purification zone partition plates 11 for partitioning the purification zone, a cylindrical water distribution sump 13 located in an axial center of the purification zone 12, a rotating shaft 14 fixedly connected to the four purification zone partition plates 11, a motor 18 for driving the rotating shaft 14 to rotate, a fixed support 15 fixedly connected to the motor 18 and configured to support the apparatus, and a water tank 16 provided under the purification zone 12; the four purification zone partition plates 11 include a first partition plate 11-1, a second partition plate 11-2, a third partition plate 11-3 and a fourth partition plate 11-4; and the first partition plate 11-1 forms an angle of 135° with a horizontal direction from left to right, the second partition plate 11-2 forms an angle of 45° with the horizontal direction from left to right, the third partition plate 11-3 forms an angle of 135° with a vertical direction from bottom to top, and the fourth partition plate 11-4 forms an angle of 135° with the vertical direction from bottom to top.

The four purification zone partition plates 11 are uniformly distributed in the purification zone 12 of the high-salinity wastewater adsorption treatment system 1, to axially and uniformly partition the purification zone 12 into four independent sector-shaped treatment subzones: a first treatment subzone 121, a second treatment subzone 122, a third treatment subzone 123, and a fourth treatment subzone 124; and a hydrogel material having a purification effect is filled in each of the four treatment subzones.

The purification zone 12, the water distribution sump 13 and the rotating shaft 14 are coaxial As shown in FIG. 2, the movably-connected drainage system 2 includes a feed pipe 20, a feed water distribution pipe 21 connected to the feed pipe 20, a cleaning water distribution pipe 22, a cleaning water feed pipe 223 configured to feed water to the cleaning water distribution pipe 22 and connected to the cleaning water distribution pipe 22, a water distribution partition plate 24, and a wastewater adsorption discharge pipe 23 provided in the water distribution sump 13.

As shown in FIG. 1, the feed water distribution pipe 21 includes a first feed water distribution pipe 201, a second feed water distribution pipe 202, a third feed water distribution pipe 203 and a fourth feed water distribution pipe 204 that are respectively arranged at geometric centers of the four treatment subzones, the wastewater adsorption discharge pipe 23 and the cleaning water distribution pipe 22 are arranged in the cylindrical water distribution sump 13 and have opposite feed directions in an axial direction, and the water distribution partition plate 24 separates the wastewater adsorption discharge pipe 23 from the cleaning water distribution pipe 22 in a radial and vertical direction of the water distribution sump 13; and both the wastewater adsorption discharge pipe 23 and the cleaning water distribution pipe 22 are tangent to an inner wall of the water distribution sump 13.

Figure 3:
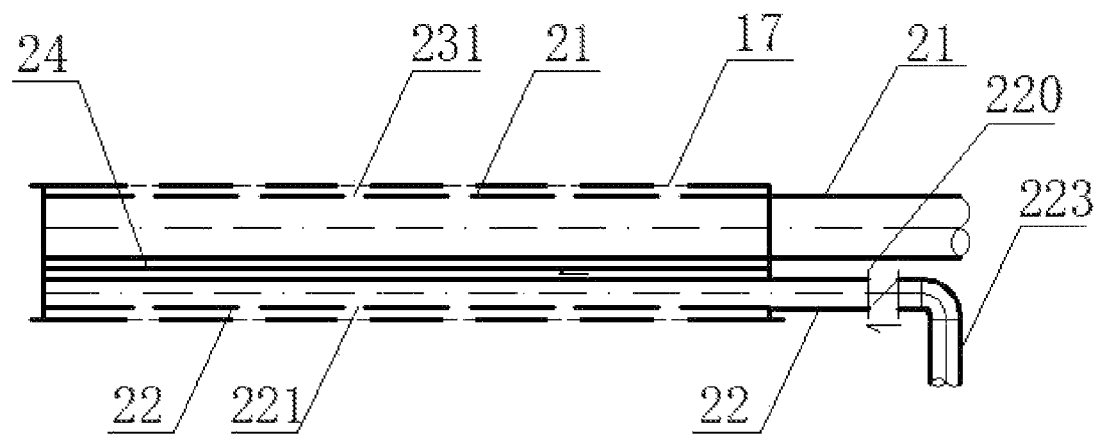
FIG. 3 is a detailed view of a movably-connected drainage system in a movably-connected and continuously-connected apparatus for uninterrupted high-salinity wastewater purification provided by the present disclosure.

As shown in FIGS. 2-3, a surface of the feed water distribution pipe 21 is provided with feed water distribution holes 211 circumferentially and uniformly distributed along cross sections of the feed water distribution pipe 21; a row of discharge water distribution holes 231 facing vertically upward are sequentially and axially provided on the wastewater adsorption discharge pipe 23; and a row of cleaning water distribution holes 221 facing vertically downward are sequentially and axially provided on the cleaning water distribution pipe 22.

As shown in FIG. 2, the water distribution sump 13 has a diameter of 105 mm; the water distribution sump 13 includes a housing 131 and at least one row of water distribution holes 132 that are sequentially arranged on a surface of the housing 131, face vertically upward in an axial direction, and face the first treatment subzone 121; and circle centers of the feed water distribution holes 211 and circle centers of the water distribution holes 132 of the water distribution sump are in a one-to-one correspondence in the first treatment subzone 121.

As shown in FIG. 3, a filter screen 17 is provided on a contact surface between the sector-shaped treatment subzone and the water distribution sump 13, and a hole diameter of the filter screen 17 is 21% of a diameter of the water distribution hole 132 of the water distribution sump.

The feed water distribution hole 211 has a diameter of 2.3 mm; and the diameter of the feed water distribution hole 211 is 82% of a diameter of the corresponding water distribution hole 132 of the water distribution sump.

The feed pipe 20 and the first feed water distribution pipe 201 to the fourth feed water distribution pipe 204 are movably connected, a feed check valve 25 is provided on the feed water distribution pipe 21, and a diameter of the feed pipe 20 is 63% of the diameter of the water distribution sump 13.

Figure 4:
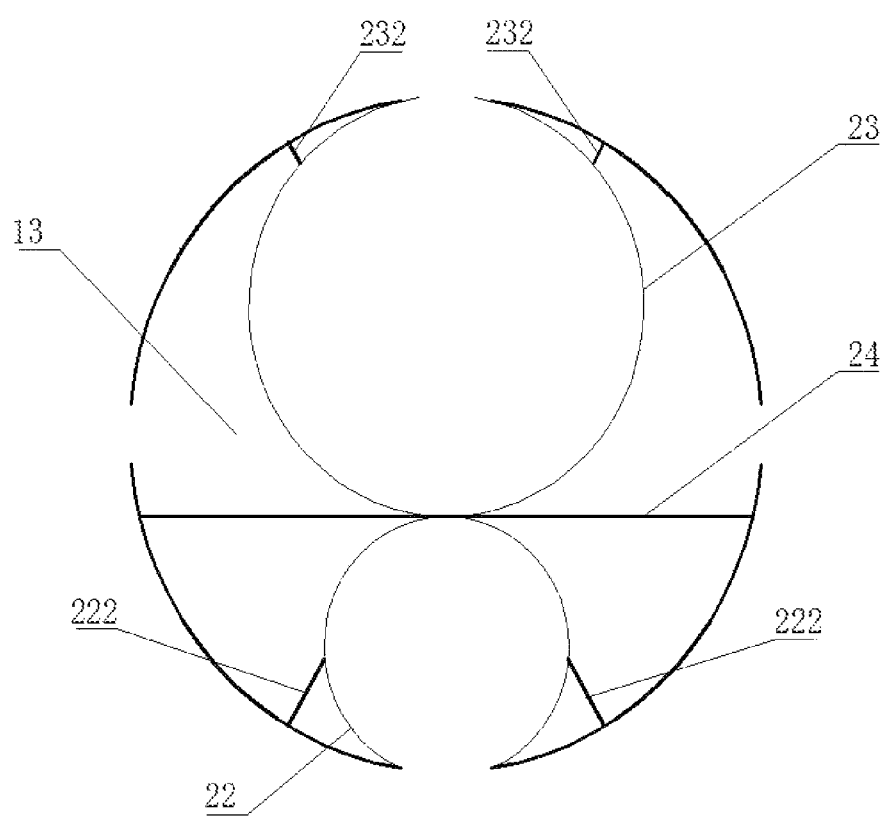
FIG. 4 is a side view of a feed water distribution pipe and a cleaning water distribution pipe in an apparatus provided by the present disclosure.
Figure 5:
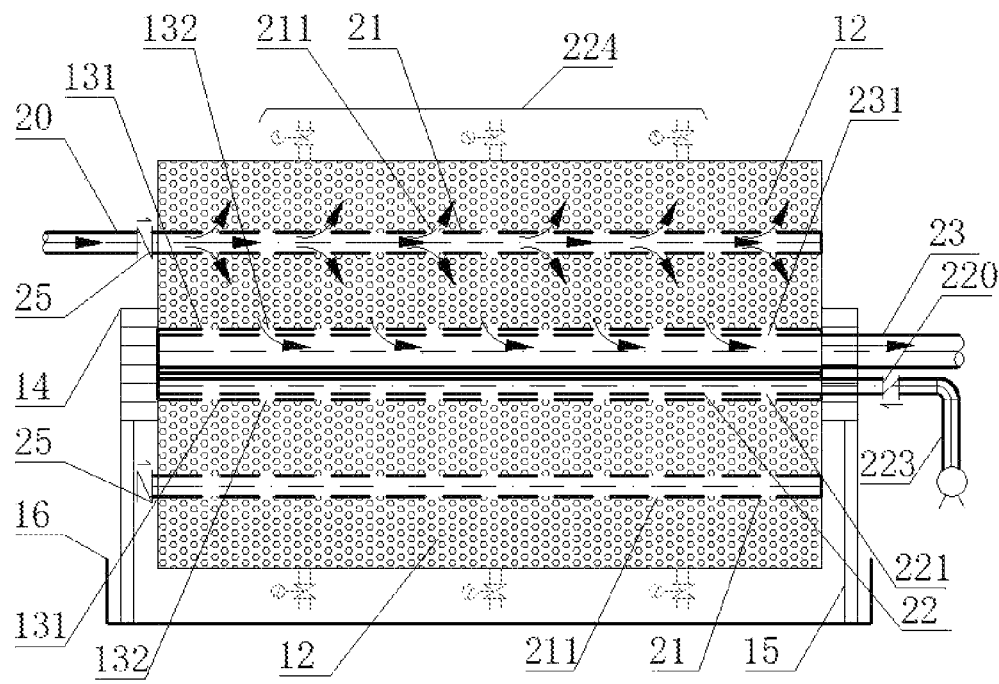
FIG. 5 is a front view of a movably-connected and continuously-connected apparatus for uninterrupted high-salinity wastewater purification provided by the present disclosure in a state of Step S2 in operation.
Figure 6:
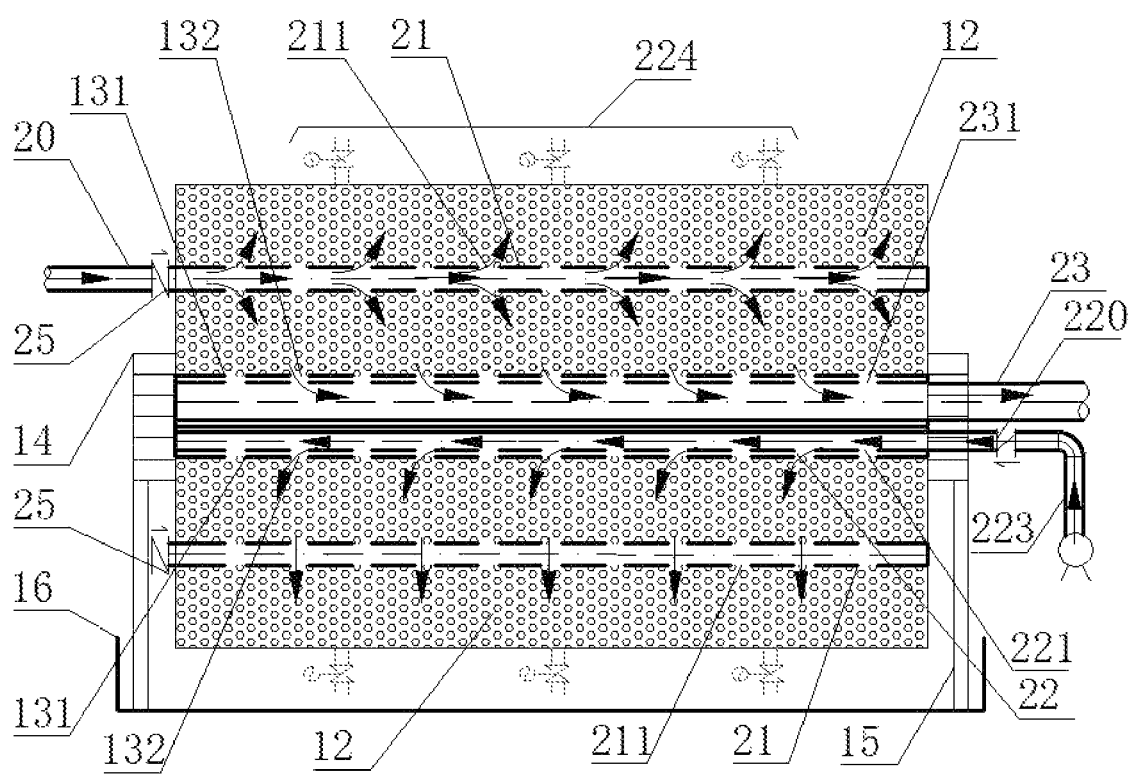
FIG. 6 is a front view of a movably-connected and continuously-connected apparatus for uninterrupted high-salinity wastewater purification provided by the present disclosure in a state of Steps S3-S5 in operation.

As shown in FIG. 4, wastewater adsorption discharge baffles 232 are provided on the wastewater adsorption discharge pipe 23; and the wastewater adsorption discharge baffles 232 are distributed on a wall of the wastewater adsorption discharge pipe 23, such that water flowing out from the purification zone 12 enters the wastewater adsorption discharge pipe 23 rather than flowing into the water distribution sump 13.

Preferably, four rows of water distribution holes 132 are axially and sequentially arranged on the surface of the housing 131 of the water distribution sump; and the four rows of water distribution holes 132 are circumferentially and uniformly distributed along cross sections of the water distribution sump 13, and thus there are also four rows of water distribution holes 132 that are sequentially arranged on the surface of the housing 131 of the water distribution sump, and face vertically upward in the axial direction.

As shown in FIG. 2, a cleaning water check valve 220 for controlling whether the cleaning water feed pipe 223 feeds water is provided on the cleaning water feed pipe 223, and a diameter of the cleaning water feed pipe 223 is 22% of the diameter of the water distribution sump 13.

As shown in FIG. 4, cleaning water distribution baffles 222 are provided on the cleaning water distribution pipe 22; and the cleaning water distribution baffles 222 are distributed on a wall of the cleaning water distribution pipe 22, such that water flowing out from the cleaning water distribution pipe 22 enters the purification zone 12 rather than flowing into the water distribution sump 13.

As shown in FIGS. 1-2, three cleaning water and wastewater discharge pipes 224 in a row are axially arranged outside each treatment subzone; each cleaning water and wastewater discharge pipe 224 includes a timing solenoid valve; and the water tank 16 is configured to receive an effluent from the cleaning water and wastewater discharge pipe 224.

A hydrogel filler in each treatment subzone has a thickness of 302 mm, and the internal hydrogel material has a filling rate of 60.5%; the purification zone partition plate 11 and the water distribution sump 13 are welded and treated to be waterproof; the purification zone partition plate 11 is made of a stainless steel material; and the housing 131 of the water distribution sump 13 is cylindrical, has a diameter of 210 mm, and is made of stainless steel.

The movably-connected and continuously-connected apparatus for uninterrupted high-salinity wastewater purification provided by the present disclosure has the following working principles:

S1: The high-salinity wastewater enters the first feed water distribution pipe 201 through the feed pipe 20 of the movably-connected drainage system 2, and enters the high-salinity wastewater adsorption treatment system 1 through the feed water distribution holes 211 on the surface of the first feed water distribution pipe 201 that are circumferentially and uniformly distributed along the cross sections of the first feed water distribution pipe 201, and the system starts timing and sets an operating period as T. In this step, the feed pipe 20 feeds water continuously.

The hydrogel filler for adsorbing the high-salinity wastewater for removal is filled in the high-salinity wastewater adsorption treatment system 1.

S2: The high-salinity wastewater enters the first treatment subzone 121 in the high-salinity wastewater adsorption treatment system 1, enters the wastewater adsorption discharge pipe 23 through the discharge water distribution hole 231, and flows out of the apparatus. When the high-salinity wastewater flows through the treatment subzone, pollutants are intercepted.

S3: The rotating shaft 14 in the high-salinity wastewater adsorption treatment system 1 is driven by the motor 18 to rotate, such that the first treatment subzone 121 in the high-salinity wastewater adsorption treatment system rotates 90° to enter a position where the second treatment subzone 122 is located, and the second treatment subzone 122 to the fourth treatment subzone 124 rotate 90° at the same time; and at this time, the feed pipe 20 is connected to the second feed water distribution pipe 202.

S4: The high-salinity wastewater enters the second feed water distribution pipe 202 through the feed pipe 20 of the movably-connected drainage system 2, and enters, through the second feed water distribution pipe 202, the treatment subzone where the original first treatment subzone 121 is located in the high-salinity wastewater adsorption treatment system 1.

S5: After Step S3 is repeated twice, the first treatment subzone 121 is located at the bottom of the apparatus; and the first treatment subzone 121 is cleaned with the cleaning water feed pipe 223 of the movably-connected drainage system 2.

Specifically, there are the following steps:

S51: After Step S3 is repeated twice, the first treatment subzone 121 in the high-salinity wastewater adsorption treatment system 1 uses the hydrogel filler therein to fully adsorb pollutants in the high-salinity wastewater for removal; and at this time, the first treatment subzone 121 rotates 180° and is located at the bottom of the system.

S52: The system turns on the cleaning water check valve 220 in the cleaning water feed pipe 223, such that the cleaning water feed pipe 223 starts to feed water, and fill the water into the first treatment subzone 121 for cleaning; the cleaning water for cleaning the first treatment subzone 121 flows out from the cleaning water and wastewater discharge pipe 224; and with the intermittent operation time being 0.4 T, the cleaning water feed pipe 223 is initially turned on within 2T after the feed pipe 20 starts to feed the water.

S6: Steps S3-S5 are repeated to accomplish unintermittent removal of the pollutants in the high-salinity wastewater, i.e., after the first treatment subzone 121 is cleaned completely, Step S3 is continuously repeated once and Steps S51-S53 are repeated once, thereby completing feeding of the high-salinity wastewater to the next treatment subzone through the feed water distribution hole 211 of the high-salinity wastewater adsorption treatment system 1, as well as wastewater discharging and cleaning of the cleaning water distribution hole 221 on the next treatment subzone.

The rotating shaft 14 in the high-salinity wastewater adsorption treatment system 1 is driven by the motor 18 to rotate clockwise or counterclockwise.

The apparatus provided by the present disclosure includes the high-salinity wastewater adsorption treatment system 2 and the movably-connected drainage system 2 nested therein; the purification zone is of the hollow cylindrical structure, and is separated by the purification zone partition plate into four treatment subzones, namely the first treatment subzone 121 to the fourth treatment subzone 124. Specifically, the purification zone partition plate 11, the filter screen 17 and the housing of the purification zone are jointly formed into an enclosed sector-shaped prism structure, and the treatment subzone on each sector-shaped section is filled with the hydrogel material having the water purification effect.

The hollow portion in the high-salinity wastewater adsorption treatment system 1 is the water distribution sump 13, is internally and tangentially provided with the feed water distribution pipe 21 and the cleaning water distribution pipe 22 having opposite feed directions, and is separated up and down by the water distribution partition plate 24; and preferably, the diameter of the feed water distribution pipe 21 is more than that of the cleaning water distribution pipe 22. The wastewater entering the system from the feed pipe 20 sequentially passes through the feed water distribution hole 211 on the feed water distribution pipe 21 and the water distribution hole 132 on the water distribution sump 13, to sequentially and continuously feed water to each treatment subzone. The cleaning water entering the system from the cleaning water distribution pipe 22 sequentially passes through the cleaning water distribution hole on the cleaning water distribution pipe and the water distribution hole on the water distribution sump, to sequentially and continuously clean each treatment subzone. Each treatment subzone is fixedly connected to the water distribution sump 13. The system periodically rotates 90° each time but the feed water distribution pipe 21 and the cleaning water distribution pipe 22 do not rotate therewith, thereby implementing continuous treatment on the wastewater and continuous cleaning on the system. The present disclosure can use the adsorbent repeatedly while treating the heavy metals in the high-salinity wastewater, and has the remarkable advantages of strong stability, simple maintenance, long service life, etc.

Example 2

The differences between the example and Example 1 lie in: In the movably-connected and continuously-connected apparatus for uninterrupted high-salinity wastewater purification used by the example, the water distribution sump 13 has the diameter 240 mm, and the hole diameter of the filter screen 17 is 37% of a diameter of the water distribution hole 132 of the water distribution sump; the feed water distribution hole 211 has the diameter of 3.5 mm; and the diameter of the feed water distribution hole 211 is 76% of the diameter of the corresponding water distribution hole 132 of the water distribution sump, and the diameter of the feed pipe 20 is 61% of the diameter of the water distribution sump 13.

The diameter of the cleaning water feed pipe 223 is 27% of the diameter of the water distribution sump 13. The hydrogel filler in each treatment subzone has the thickness of 550 mm, the internal hydrogel material has the filling rate of 65%, and the water distribution sump 13 has the diameter of 1,400 mm.

Example 3

The differences between the example and Example 1 lie in: In the movably-connected and continuously-connected apparatus for uninterrupted high-salinity wastewater purification used by the example, the water distribution sump 13 has the diameter 333 mm, and the hole diameter of the filter screen 17 is 72.5% of a diameter of the water distribution hole 132 of the water distribution sump; the feed water distribution hole 211 has the diameter of 5.77 mm; and the diameter of the feed water distribution hole 211 is 86% of the diameter of the corresponding water distribution hole 132 of the water distribution sump, and the diameter of the feed pipe 20 is 78.5% of the diameter of the water distribution sump 13. The diameter of the cleaning water feed pipe 223 is 28% of the diameter of the water distribution sump 13.

The hydrogel filler in each treatment subzone has the thickness of 769 mm, the internal hydrogel material has the filling rate of 87%, and the housing 131 of the water distribution sump 13 is cylindrical, and has a diameter of 2,430 mm.

All other examples obtained by those of ordinary skill in the art based on the examples of the present application without creative efforts should fall within the protection scope of the present application.

Moreover, the terms such as "first", "second", and the like described in the present disclosure are used herein only for the purpose of description and are not intended to indicate or imply relative importance, or implicitly indicate the number of the indicated technical features. Therefore, features defined by "first" and "second" may explicitly or implicitly include at least one of the features. Furthermore, the technical solutions between the various examples may be combined with each other, but must be on the basis that the combination thereof can be implemented by a person of ordinary skill in the art. In case of a contradiction with the combination of the technical solutions or a failure to implement the combination, it should be considered that the combination of the technical solutions does not exist, and is not within the protection scope of the present application.

Then, all the directional indications, such as upper, lower, left, right, front, back, etc., in the examples of the present application are merely used to explain a relative position relationship, motion situations, and the like of the components in a specific gesture (as shown in the figures). If the specific gesture changes, the directivity indication also changes accordingly. The direction herein may be direct connection, and may also be indirect connection.

Although the present disclosure has been described with reference to the preferred examples, various improvements can be made and components therein can be replaced with equivalents without departing from the scope of the present disclosure. In particular, as long as there is no structural conflict, the technical features in the examples can be combined in any way. The present disclosure is not limited to the specific examples disclosed herein, but shall include all technical solutions falling within the scope of the claims.

What is claimed is:

1. A movably-connected and continuously-connected apparatus for uninterrupted high-salinity wastewater purification, comprising
   a high-salinity wastewater adsorption treatment system and a movably-connected drainage system embedded in the high-salinity wastewater adsorption system, wherein
      the high-salinity wastewater adsorption treatment system comprises a hollow cylindrical purification zone, four purification zone partition plates for partitioning the hollow cylindrical purification zone, a cylindrical water distribution sump located in an axial center of the hollow cylindrical purification zone, a rotating shaft fixedly connected to the four purification zone partition plates, a motor for driving the rotating shaft to rotate, a fixed support fixedly connected to the motor and configured to support the movably-connected and continuously-connected apparatus, and a water tank provided under the hollow cylindrical purification zone;
      the four purification zone partition plates comprise a first partition plate, a second partition plate, a third partition plate and a fourth partition plate;
         the first partition plate forms an angle of 135° with a horizontal direction from left to right, the second partition plate forms an angle of 45° with the horizontal direction from left to right, the third partition plate forms an angle of 135° with a vertical direction from bottom to top, and the fourth partition plate forms an angle of 135° with the vertical direction from bottom to top;
      the four purification zone partition plates are uniformly distributed in the hollow cylindrical purification zone of the high-salinity wastewater adsorption treatment system, to axially and uniformly partition the hollow cylindrical purification zone into four independent sector-shaped treatment subzones comprising a first treatment subzone, a second treatment subzone, a third treatment subzone, and a fourth treatment subzone;
      a hydrogel material having a purification effect is filled in each of the four independent sector-shaped treatment subzones;
      the hollow cylindrical purification zone, the cylindrical water distribution sump and the rotating shaft are coaxial;
   the movably-connected drainage system comprises a feed pipe, a feed water distribution pipe, a cleaning water distribution pipe, a cleaning water feed pipe, a water distribution partition plate, and a wastewater adsorption discharge pipe, wherein
      the feed water distribution pipe is connected to the feed pipe, the cleaning water feed pipe is connected to the cleaning water distribution pipe to feed water to the cleaning water distribution pipe, and the wastewater adsorption discharge pipe is provided in the cylindrical water distribution sump;
      the feed water distribution pipe comprises a first feed water distribution pipe, a second feed water distribution pipe, a third feed water distribution pipe and a fourth feed water distribution pipe, wherein the first feed water distribution pipe, the second feed water distribution pipe, the third feed water distribution pipe and the fourth feed water distribution pipe are respectively arranged at geometric centers of the four independent sector-shaped treatment subzones;
      the wastewater adsorption discharge pipe and the cleaning water distribution pipe are arranged in the cylindrical water distribution sump and have opposite feed directions in a first axial direction;
      the water distribution partition plate separates the wastewater adsorption discharge pipe from the cleaning water distribution pipe in a radial and vertical direction of the cylindrical water distribution sump;
      both the wastewater adsorption discharge pipe and the cleaning water distribution pipe are tangent to an inner wall of the cylindrical water distribution sump;
      a surface of the feed water distribution pipe is provided with feed water distribution holes circumferentially and uniformly distributed along cross sections of the feed water distribution pipe;

a row of discharge water distribution holes facing vertically upward are sequentially and axially provided on the wastewater adsorption discharge pipe; and a row of cleaning water distribution holes facing vertically downward are sequentially and axially provided on the cleaning water distribution pipe.

2. The movably-connected and continuously-connected apparatus according to claim 1, wherein the cylindrical water distribution sump has a diameter of 100-350 mm;

the cylindrical water distribution sump comprises a housing and at least one row of water distribution holes, wherein the at least one row of water distribution holes are sequentially arranged on a surface of the housing, face vertically upward in a second axial direction, and face the first treatment subzone;

circle centers of the feed water distribution holes and circle centers of the at least one row of water distribution holes of the cylindrical water distribution sump are in a one-to-one correspondence in the first treatment subzone;

a filter screen is provided on a contact surface between each of the four independent sector-shaped treatment subzone and the cylindrical water distribution sump, and a hole diameter of the filter screen is 20-75% of a diameter of each of the at least one row of water distribution holes of the cylindrical water distribution sump.

3. The movably-connected and continuously-connected apparatus according to claim 2, wherein four rows of water distribution holes are axially and sequentially arranged on the surface of the housing of the cylindrical water distribution sump, and the four rows of water distribution holes are circumferentially and uniformly distributed along cross sections of the cylindrical water distribution sump.

4. The movably-connected and continuously-connected apparatus according to claim 1, wherein the feed pipe, the first feed water distribution pipe, the second feed water distribution pipe, the third feed water distribution pipe and the fourth feed water distribution pipe are movably connected, a feed check valve is provided on the feed water distribution pipe, and a diameter of the feed pipe is 60-80% of a diameter of the cylindrical water distribution sump.

5. The movably-connected and continuously-connected apparatus according to claim 1, wherein wastewater adsorption discharge baffles are provided on the wastewater adsorption discharge pipe; and the wastewater adsorption discharge baffles are distributed on a wall of the wastewater adsorption discharge pipe, and water flowing out from the hollow cylindrical purification zone enters the wastewater adsorption discharge pipe and does not flow into the cylindrical water distribution sump.

6. The movably-connected and continuously-connected apparatus according to claim 1, wherein a cleaning water check valve for controlling whether the cleaning water feed pipe feeds water is provided on the cleaning water feed pipe, and a diameter of the cleaning water feed pipe is 20-30% of a diameter of the cylindrical water distribution sump.

7. The movably-connected and continuously-connected apparatus according to claim 1, wherein cleaning water distribution baffles are provided on the cleaning water distribution pipe; and the cleaning water distribution baffles are distributed on a wall of the cleaning water distribution pipe, and water flowing out from the cleaning water distribution pipe enters the hollow cylindrical purification zone and does not flow into the cylindrical water distribution sump.

8. The movably-connected and continuously-connected apparatus according to claim 1, wherein three cleaning water and wastewater discharge pipes in a row are axially arranged outside each of the four independent sector-shaped treatment subzones;

each of the three cleaning water and wastewater discharge pipes comprises a timing solenoid valve; and the water tank is configured to receive an effluent from each of the three cleaning water and wastewater discharge pipes.

9. The movably-connected and continuously-connected apparatus according to claim 1, wherein a hydrogel filler in each of the four independent sector-shaped treatment subzones has a thickness of 300-800 mm, and the hydrogel material has a filling rate of 60-90%;

the four purification zone partition plates and the cylindrical water distribution sump are welded and treated to be waterproof;

each of the four purification zone partition plates is made of a stainless steel material; and a housing of the cylindrical water distribution sump is cylindrical, has a diameter of 200-2,500 mm, and is made of stainless steel.

* * * * *